United States Patent Office 3,493,517
Patented Feb. 3, 1970

3,493,517
METAL PHOSPHATE CONTAINING CATALYSTS
AND PREPARATION THEREOF
Joseph Jaffe, Berkeley, Calif., assignor to Chevron Research Company, San Francisco, Calif., a corporation of Delaware
No Drawing. Filed Oct. 2, 1967, Ser. No. 671,994
Int. Cl. B01j 11/82
U.S. Cl. 252—437                                8 Claims

ABSTRACT OF THE DISCLOSURE

Hydrotreating catalysts comprising discrete metal phosphate particles in a continuous phase matrix of other catalyst components, and processes for making and using said catalysts.

---

In accordance with the present invention there is provided a catalyst composite comprising (A) A carrier comprising at least one component selected from silica and alumina and at least one hydrogenating component selected from Group VI metals and compounds thereof and Group VIII metals and compounds thereof, and (B) Discrete, substantially insoluble metal phosphate particles (1) dispersed in said carrier, (2) consisting essentially of at least one metal phosphate selected from phosphates of zirconium, titanium, tin, thorium, cerium and hafnium, (3) containing substantially the entire phosphorus content of said catalyst, and (4) containing phosphorus in an amount of 3 to 15 weight percent of the total catalyst, expressed as $P_2O_5$.

In preferred embodiments of the present invention, said hydrogenating component may comprise nickel or a compound thereof and either tungsten or a compound thereof or molybdenum or a compound thereof.

In accordance with the present invention there is provided also the method of manufacturing a hydrocarbon conversion catalyst which comprises substantially uniformly dispersing discrete, substantially insoluble metal phosphate particles in a carrier comprising at least one component selected from silica and alumina and at least one hydrogenating component selected from Group VI metals and compounds thereof and Group VIII metals and compounds thereof, said metal phosphate particles (1) consisting essentially of at least one metal phosphate selected from phosphates of zirconium, titanium, tin, thorium, cerium and hafnium, (2) containing substantially the entire phosphorus content of said catalyst, (3) containing phosphorus in an amount of 3 to 15 weight percent of the total catalyst, expressed as $P_2O_5$.

In one embodiment of the present invention, said metal phosphate particles are preformed, are dispersed in a liquid medium comprising precursors of said carrier, and said liquid medium is caused to form a gel surrounding said particles. In another embodiment of the present invention, said particles are formed by reaction of a water-soluble phosphorus compound with a water-soluble compound selected from compounds of zirconium, titanium, tin, thorium, cerium and hafnium, said reaction being accomplished at a pH below 3.0 in an aqueous medium comprising precursors of said carrier, and wherein following formation of said particles said liquid medium is caused to form a gel surrounding said particles.

PRIOR ART

Prior art hydrocarbon conversion catalysts are known that contain metal phosphates, for example: (a) catalysts comprising a support impregnated with a soluble metal phosphate such as tungsten phosphate, rather than an insoluble metal phosphate; (b) catalysts comprising insoluble metal phosphates that are not discrete, selectively prepared, insoluble metal phosphate particles in a continuous phase matrix of nonphosphate catalyst components, but that are miscellaneous phosphates that have resulted from a nonselective and indiscriminate reaction of a soluble phosphorus compound with a plurality of catalyst component precursors; and (c) catalysts comprising insoluble metal phosphates and a catalyst support but not containing a hydrogenating component.

DETAILED DESCRIPTION

General

The present invention is concerned with novel hydrocarbon conversion catalysts comprising discrete, insoluble metal phosphate particles surrounded by a continuous phase matrix comprising at least one solid oxide and at least one hydrogenating component selected from Group VI metals and compounds thereof and Group VIII metals and compounds thereof, and with methods of preparation and use of said catalyst. The term "insoluble" as used herein means substantially insoluble in water or in any liquid medium at a pH below 7.

Catalysts of present invention and preparation thereof

(A) GENERAL (a) *Utility.*—The catalysts have utility in various hydrotreating reactions, including hydrocracking and hydrodenitrification reactions. The catalysts are particularly outstanding as hydrodenitrification catalysts.

(b) *Bulk density.*—The catalysts of the present invention generally have lower bulk densities than similar catalysts that do not contain a separate discontinuous phase of insoluble metal phosphate particles. In general, the fouling rate of the catalyst decreases as the weight ratio of metal phosphate particles to continuous phase matrix in the catalyst rises. It is preferred to maintain the $P_2O_5$ content of the final catalyst in the range of 3 to 15 weight percent of the total catalyst.

(B) METAL PHOSPHATE COMPONENTS AND FORMATION THEREOF (a) *General.*—The insoluble metal phosphate components are more particularly phosphates of tetravalent metals, especially zirconium, titanium, tin, thorium, cerium and hafnium. The insoluble metal phosphate particles may be preformed and then dispersed in a hydrous gel precursor of the final continuous phase matrix, or dispersed in a liquid medium containing precursors of the final continuous phase matrix, after which said liquid medium is converted to gel form. Alternatively, the insoluble metal phosphate components may be formed in situ in a liquid medium containing precursors of the final continuous phase matrix, after which said liquid medium is converted to gel form. In any case the insoluble metal phosphate particles may be prepared by reacting in an aqueous medium, preferably comprising a large stoichiometric excess of water, a water-soluble salt of one of the aforesaid tetravalent metals with a water-soluble source of phosphate ion.

(b) *Excess of $H_2O$ when insoluble metal phosphates prepared separately.*—When the insoluble metal phosphates are prepared separately it is convenient to maintain sufficient water in the reaction mix so that the reactants will react readily and so that the reaction will go to completion. The excess water also is useful in enabling the resulting slurry to be readily transportable.

(c) *Water-soluble salt of tetravalent metal.*—The water-soluble salt of the aforesaid tetravalent metals may be any convenient salt, for example the chloride, oxychloride, nitrate, sulfate, acetate, iodide and bromide. As a further example, where zirconium is the tetravalent metal, the water-soluble zirconium salt may be any of the readily available zirconium salts such as zirconium tetrachloride, zirconyl chloride, zirconium sulfate, zirconyl bromide, zirconium tetraiodide and zirconyl iodide.

(d) *Water-soluble source of phosphate ion.*—The water-soluble source of phosphate ion may be any water-soluble phosphoric acid or other water-soluble phosphorus compound, preferably in which the phosphorus has a valence of +5, that under the conditions of contact with the tetravalent metal salt will cause precipitation of insoluble metal phosphates. Such water-soluble sources of phosphate ion are those which will release $P_2O_5$, for example orthophosphoric acid $H_3PO_4 (2H_3PO_4 \rightarrow P_2O_5 + 3H_2O)$. Other suitable water-soluble sources of phosphate ion include: ammonium phosphate,

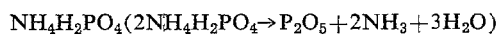

tetraphosphoric acid, $H_6P_4O_{13} (H_6P_4O_{13} \rightarrow 2P_2O_5 + 3H_2O)$; and metaphosphoric acid, $HPO_3 (4HPO_3 \rightarrow 2P_2O_5 + 2H_2O)$.

(e) *Stoichiometric ratio of the soluble phosphorus compound to soluble tetravalent metal compound.*—It is especially preferred to avoid an amount of soluble phosphorus compound in excess of that which will provide sufficient phosphate ion to react with the soluble metal compound. Any excess of soluble phosphorus compound will tend to act as a catalyst poison. In general the molar ratio $P_2O_5:MeO_2$ (Me=Zr, Th, etc.) should not exceed 1:1. Such ratio will insure the absence of excess $P_2O_5$ which might act as a poison in the final catalyst. Although it is preferable not to use an excess of soluble phosphorus compound, it is permissible to use an excess of the tetravalent metal compound, because that excess generally is not detrimental to the final catalyst.

(f) *pH ranges to be observed.*—When the insoluble metal phosphate particles are separately preformed and then added to a gel precursor of the final continuous phase matrix, or added to a liquid medium containing precursors of the final continuous phase matrix, the pH at which the addition is made is not critical, except that it should be a pH of 8 or below. Above a pH of about 8 the phosphate ion would be hydrolyzed from the metal phosphate particles, whereas at a pH below about 8 the metal phosphate particles remain insoluble. However, when the insoluble metal phosphate particles are formed in situ in a liquid medium containing precursors of the final continuous phase matrix it is important that the formation occur at a pH below about 3.0 and preferably at a pH below about 2.5, in order that the soluble phosphate ion source will react only with the soluble tetravalent metal salt, and not with the precursors of the final continuous phase matrix. That is, it is important to observe the indicated pH limitation in order to accomplish a selective precipitation of the desired insoluble metal phosphate particles, before precipitation of the components of the final continuous phase matrix occurs. Once precipitation of the insoluble metal phosphate particles has occurred in the liquid medium containing precursors of the final continuous phase matrix, the pH thereafter may be raised to cause gelation or precipitation of the precursors of the final continuous phase matrix around the insoluble metal phosphate particles, without affecting the character of the insoluble metal phosphate particles, because once formed those particles remain insoluble and will not dissociate at a pH up to about 8.

It will be noted that if the final continuous phase matrix were first precipitated, and then were combined with a soluble phosphorus compound such as orthophosphoric acid, the phosphorus compound would react indiscriminately with all components that might be present in the final continuous phase matrix, for example with any aluminum salts and nickel salts that might be present as well as with the soluble salts of the tetravalent metals that are intended to be converted to insoluble metal phosphates. Such an indiscriminate reaction would produce an inferior catalyst. It already has been noted that such an indiscriminate reaction would occur if the precursors of the final continuous phase matrix were not precipitated first, and an attempt were made to precipitate the insoluble phosphates of the tetravalent metals at a pH above about 3.0 in situ in a liquid medium containing precursors of the final continuous phase matrix.

(C) CONTINUOUS PHASE MATRIX AND FORMATION THEREOF (a) *General.*—As previously indicated, and as will be further apparent from this section C. and from the examples hereinafter set forth, the continuous phase matrix of the catalyst of the present invention may be formed around the insoluble phosphate particles by: (1) being formed as a hydrous gel matrix into which the insoluble phosphate particles are dispersed after formation of the gel matrix; or (2) being formed as an aqueous solution, in which the insoluble metal phosphate particles are dispersed, followed by gelation of said solution around said particles; or (3) being formed first in part as a liquid medium in which insoluble metal phosphate particles are formed by reaction of a soluble metal salt and a soluble phosphorus compound, followed by addition to said liquid medium of additional catalyst components, followed by gelation of the resulting liquid medium around said metal phosphate particles.

(b) *Excess of $H_2O$.*—It is desirable in any liquid medium comprising precursors of the final continuous phase matrix to maintain a large excess of water, preferably sufficient to maintain the solids content in the liquid medium below 10 weight percent and more preferably in the range 3 to 5 weight percent. Such a large excess of water will facilitate intimate mixing of the reactants and will insure that when the matrix is precipitated it will be readily stirrably. Additionally, because it is desirable to remove certain soluble salts from the matrix gel, and because such removal is conveniently accomplished by filtration and washing, a large excess of water during gel formation will facilitate removal of a maximum quantity of salts during the first filtration, thus facilitating subsequent washing steps.

(c) *At least one solid oxide.*—The final catalyst continuous phase matrix comprises at least one solid oxide, for example silica, alumina or silica-alumina. Those skilled in the art will easily be able to select the appropriate precursor compound suitable for producing the desired solid oxide. Where the solid oxide is to be alumina or silica-alumina the precursor of the alumina conveniently may be aluminum chloride. Where the solid oxide is to be silica the precursor of the silica conveniently may be sodium silicate.

(d) *At least one hydrogenating component.*—The final catalyst composition comprises at least one hydrogenating component selected from Group VI metals and compounds thereof and Group VIII metals and compounds thereof. Those skilled in the art will easily be able to select the appropriate precursor compound suitable for producing the desired hydrogenating component. Suitable precursors for Group VI and Group VIII hydrogenating components of the final catalyst include tungstic acid, sodium tungstate, ammonium tungstate, molybdenum chloride, sodium or ammonium molybdate, and the chlorides, acetates and nitrates of nickel and cobalt. It is preferable that nickel or a compound thereof be present in the final catalyst, whether it is to be used as a hydrocracking catalyst or as a hydrodenitrification catalyst. It is desirable that tungsten or a compound thereof, or molybdenum or a compound thereof, be present in the final catalyst when it is to be used as a hydrodenitrification catalyst. Catalysts prepared according to the process of the present invention that comprise nickel or a compound thereof and tungsten or a compound thereof, or that comprise nickel or a compound thereof and molybdenum or a compound thereof, are particularly outstanding hydrodenitrification catalysts.

(e) *Other components.*—The catalysts of the present invention may comprise molecular sieves, particularly when the catalysts are to be used as hydrocracking catalysts. The molecular sieves may be incorporated in the catalyst by addition to the continuous phase matrix when that matrix is in hydrous gel form, or to any liquid phase medium containing precursors of the continuous phase matrix. The molecular sieves should not be subjected to a pH below 4.0 because they are subject to decomposition at such low pH values. When the final catalyst is to contain nickel or a compound thereof as a hydrogenating component, at the time a nickel salt is incorporated in the catalyst a tin salt also may be incorporated in the catalyst; it has been found that tin or a compound thereof enhances the effect of the nickel or compound thereof. The final catalyst may be fluorided in a conventional manner; fluorine also may be incorporated in the catalyst during preparation thereof if desired, as by the addition to the catalyst of a fluorophosphate during an intermediate stage of its preparation.

(D) CATALYST FILTERING, DRYING, WASHING, ACTIVATING, REDUCING AND SULFIDING (a) *Filtering, drying and washing.*—Following gelation of all of the catalyst components, the resulting gel precipitate in the form of an aqueous slurry is separated from the liquid portion of the slurry by filtration in a conventional manner and the precipitate is dried in a conventional manner. The drying may be accomplished in an oven at temperatures which conveniently may be between 200° and 300° F. for a time sufficient to produce adequate drying, for example, 10 to 20 hours.

The dried material may be washed until the material is free of undesired contaminants in the form of soluble salts. Particularly where a sodium salt such as sodium silicate or sodium ammonium tungstate has been used to prepare the catalyst or where chloride ion from metal chlorides is present, the wash water desirably will contain an ammonium salt such as ammonium acetate to assist in the ion-exchange removal of these impurities. A number of separate washes will be found desirable including a final wash with water, after which the washed material may again be dried in the previous manner.

(b) *Activating.*—The resulting washed and dried material is activated in a conventional manner, for example by calcination for 2 to 6 hours in dry air or other non-reducing gas at 900 to 1100° F., to produce the final catalyst in oxide form.

(c) *Reducing and sulfiding.*—Following calcination, the hydrogenating component or components of the catalyst may be converted from oxide form to metal form or sulfide form. Those skilled in the art will recognize that the catalyst of the present invention will have utility in the oxide form, metal form, or sulfided form, although generally the sulfided form is preferable.

The calcined catalyst may be reduced and sulfided in a conventional manner, for example by treating it at a temperature of 500 to 700° F. in hydrogen gas containing $H_2S$ or a precursor thereof such as dimethyl disulfide, for a period of time sufficient to insure substantial conversion of the metal oxides to metal sulfides.

Catalyst use (A) HYDRODENITRIFICATION PROCESSES (a) *General.*—As already indicated the catalysts of the present invention are outstanding hydrodenitrification catalysts.

(b) *Hydrodenitrification process operation.*—The hydrodenitrification processes utilizing the catalysts of the present invention may be carried out at conventional hydrodenitrification process conditions, for example, at temperatures in the range 500 to 800° F., pressures in the range 200 to 10,000 p.s.i.g., LHSV's based on the hydrocarbon oil feed in the range 0.2 to 10 and at hydrogen rates of 500 to 20,000 s.c.f. of $H_2$ per barrel of hydrocarbon oil feed. A hydrodenitrification process conducted under these conditions with the catalyst of the present invention will effect the removal of a substantial proportion of the nitrogen compounds contained in a wide variety of hydrocarbon feedstocks, for example, hydrocarbon distillates such as cracked naphthas, light cycle oils, coker distillates, straight run gas oils, and certain residual hydrocarbon feedstocks.

(B) HYDROCRACKING PROCESSES (a) *General.*—The catalysts of the present invention also are effective hydrocracking catalysts, particularly when they comprise silica-alumina and/or molecular sieves.

(b) *Hydrocracking process operation.*—In general hydrocracking process operation becomes much more economical with feeds containing less than 200 p.p.m., preferably below 100 p.p.m., and much more preferably below 10 p.p.m. of nitrogen. Accordingly, and because of the outstanding effectiveness of the hydrodenitrification catalysts of the present invention, it is desirable to first denitrify with those catalysts a hydrocarbon feed which is to be hydrocracked with the hydrocracking catalysts of the present invention but which has an undesirably high nitrogen content.

The feedstocks that may be effectively hydrocracked with the hydrocracking catalysts of the present invention include a wide variety of hydrocarbon oils including straight run gas oils, deasphalted oils, coker gas oils, pitch stripper gas oils, catalytic cycle oils and various residual stocks. The hydrocracking process may be operated at combinations of conditions selected from within the following ranges that will produce the desired degree of hydrocracking: a temperature of about 500° to 950° F., preferably 650° to 850° F.; a hydrogen partial pressure of 500 to 10,000 p.s.i.g., preferably 1000 to 2500 p.s.i.g.; and an LHSV of from about 0.1 to 4.0, preferably 0.4 to 2.0. The hydrogen flow to the hydrocracking zone may be from 1000 to 20,000 s.c.f. of $H_2$ per barrel of hydrocarbon feed, and preferably 2500 to 10,000 s.c.f. per barrel of feed. Because higher hydrogen partial pressures, particularly with feeds having higher nitrogen contents, result in lower catalyst fouling rates it is preferable to operate above 1000 p.s.i.g. hydrogen partial pressure.

The following examples will serve to further illustrate the catalysts of the present invention, and their preparation and use.

EXAMPLES

Example 1

This example describes preparation, sulfiding and testing of Catalyst 1, a catalyst according to the present invention, consisting of nickel sulfide, molybdenum sulfide, alumina and zirconium phosphate, containing, prior to reduction and sulfiding, nickel, molybdenum, aluminum, zirconium and phosphorus in the following percentages, expressed as oxides:

| | Weight percent of total catalyst |
|---|---|
| NiO | 10.6 |
| $MoO_3$ | 35.0 |
| $Al_2O_3$ | 47.4 |
| $ZrO_2 \cdot P_2O_5$ | 7.0 |
| Total | 100.0 |

The following two solutions were prepared:

SOLUTION 1

| | | |
|---|---|---|
| $AlCl_3 \cdot 6H_2O$ | grams | 726 |
| $NiCl_2 \cdot 6H_2O$ | do | 109.5 |
| Acetic acid | do | 180 |
| $H_2O$ | cc | 4500 |

SOLUTION 2

| | | |
|---|---|---|
| 15 M $NH_4OH$ | cc | 910 |
| $MoO_3$ | grams | 146.5 |
| $H_2O$ | cc | 3140 |

Solution 2 was stirred into Solution 1 to form a catalyst hydrogel slurry at pH ~7. The slurry was filtered, and the resulting filter cake was washed with a 5% ammonium acetate solution, then was washed with a 1% ammonium acetate solution, until substantially free of chloride, and finally was washed with water. The resulting washed filter cake was a thick gelatinous material having a solids content of 12.7 weight percent.

A 1200 gram portion of this cake was combined with 15.25 grams of zirconium phosphate powder, $$ZrO(H_2PO_4)_2 \cdot 3H_2O$$

and 250 cc. $H_2O$ in a kitchen mixer, and the mixture was mixed until it was uniform. Because the 1200 grams of cake prior to addition of the zirconium phosphate contained 12.7 weight percent, or 152.5 grams of solids, the weight ratio of zirconium phosphate to other solids after addition of the 15.25 grams of zirconium phosphate was 1:10. The mixture containing zirconium phosphate was dried in air at 250° F. for 15 hours, and then calcined in air at 800–850° F. for 4 hours, to produce the final catalyst in oxide form.

A 130 cc. portion of the catalyst so prepared was crushed to 8–14 mesh, and was sulfided by: (a) treating at 400°–450° F. at 800 p.s.i.g. with 6.3 cubic feet per hour of flowing hydrogen; (b) treating at 1.0 space velocity and a temperature of 570°–600° F. with 10% of dimethyl disulfide in mixed hexanes, for approximately 8 hours.

The catalyst so sulfided was tested for dentrification activity, by being used to continuously hydrodenitrify a portion of a California gas oil having a boiling range of 550°–850° F., a gravity of 23.1 API, an aniline point of 142.5° F., a sulfur content of 0.7%, and a nitrogen content of 2200 parts per million. The denitrification was accomplished under the following conditions:

| | |
|---|---|
| Temperature throughout on-stream period | 710° F. |
| Hydrogen rate | 2000 p.s.i.g. |
| Pressure | 6000 s.c.f./barrel of feed. |
| Space velocity | 0.77 LHSV. |
| Time on stream | 100 hours. |

Analysis of a slip stream of the resulting denitrified oil product, taken at the end of the 100 hours on-stream period, indicated the following:

| | |
|---|---|
| Gravity | 31.7° API. |
| Aniline point | 188.0° F. |
| Nitrogen content | 1.1 parts per million |

Example 2

This example describes preparation, sulfiding and testing of Catalyst 2, a comparison catalyst, consisting of nickel sulfide, molybdenum sulfide and alumina, containing, prior to reduction and sulfiding, nickel, molybdenum and aluminum in the following percentages expressed as oxides:

| | Weight percent of total catalyst |
|---|---|
| NiO | 11.5 |
| $MoO_3$ | 37.5 |
| $Al_2O_3$ | 51.0 |
| Total | 100.0 |

A washed filter cake was prepared exactly as in Example 1. This filter cake was dried in air at 250° F. for 15 hours and then calcined in air at 800°–850° F. for 4 hours to produce the final catalyst, containing no phosphate, in oxide form.

A 130 cc. portion of the catalyst so prepared was crushed to 8–14 mesh, and was reduced and sulfided exactly as in Example 1.

The catalyst so sulfided was tested for denitrification activity, by being used to continuously hydrodenitrify another portion of the California gas oil used in Example 1, at the same conditions and for the same length of time as in Example 1.

Analysis of a slip stream of the resulting denitrified oil product taken at the end of the 100 hours on-stream period, indicated the following:

| | |
|---|---|
| Gravity | 29.8° API. |
| Aniline point | 180.0° F. |
| Nitrogen content | 9.4 parts per million. |

Example 3

This example describes preparation, sulfiding and testing of Catalyst 3, a catalyst according to the present invention, consisting of nickel sulfide, tugnsten sulfide, silica, alumina and titanium phosphate, containing, prior to reduction and sulfiding, nickel, tungsten, silicon, aluminum, titanium, and phosphorus in the following percentages, expressed as oxides:

| | Weight percent of total catalyst |
|---|---|
| NiO | 10.2 |
| $Wo_3$ | 25.2 |
| $SiO_2$ | 20.0 |
| $Al_2O_3$ | 30.0 |
| $TiO_2$ | 8.0 |
| $P_2O_5$ | 6.6 |
| Total | 100.0 |

The following solutions were prepared:

SOLUTION 1

1385 grams of a stock solution of $AlCl_3$ and $H_2O$, containing 4.6 weight percent Al
200 cc. acetic acid
76 grams $TiCl_4$
4500 cc. $H_2O$
43 grams 85% $H_3PO_4$

*Note.*— A milky suspension of titanium phosphate formed on combination of the ingredients of Solution 1. The pH was <1.

SOLUTION 2

282 grams of $NiCl_2$ and $H_2O$, containing 11.35 weight percent Ni

SOLUTION 3

192 cc. sodium silicate, containing 80 grams of $SiO_2$
2000 cc. $H_2O$

SOLUTION 4

3.75 M $NH_4OH$, quantity as indicated below

SOLUTION 5

1067 cc. sodium ammonium tungstate solution, containing 0.075 grams tungsten per cc.

SOLUTION 6

3.75 M $NH_4OH$, quantity as indicated below

Solution 2 was stirred into Solution 1, and Solution 3 was added to combined Solutions 1 and 2. Sufficient Solution 4 was added to combined Solutions 1, 2 and 3 to bring the pH of the mixture of Solutions 1, 2, 3 and 4 to 4.0. Solution 5 was added to the mixture of Solutions 1, 2, 3 and 4. Sufficient Solution 6 was added to the mixture of Solutions 1, 2, 3, 4 and 5 to bring the pH of the mixture of Solutions 1–6 to 7.2. The resulting slurry was filtered to produce a filter cake, which was washed with five separate washes of 13,000 cc. of 1% ammonium acetate solution, followed by a wash with 13,000 cc. water. The so washed filter cake was hot aged for 12 hours in an autoclave at 15 p.s.i.g. steam pressure, then dried for 15 hours in air, and then calcined for 4 hours in air at 950° F., to produce the final catalyst in oxide form.

A 130 cc. portion of the catalyst so prepared was crushed to 8–14 mesh, and was reduced and sulfided exactly as in Example 1.

The catalyst so sulfided was tested for denitrification activity, by being used to continuously hydrodenitrify a portion of a California gas oil having a boiling range of 500°–900° F., a gravity of 19.1° API, an aniline point of 130° F., a sulfur content of 1.1%, and a nitrogen content of 3200 parts per million. The denitrification was accomplished under the following conditions, at a temperature selected to maintain 0.3 parts per million nitrogen in the denitrified product:

Pressure _____ 1400 p.s.i.g.
Hydrogen rate _____ 3600 SCF/barrel of feed.
Space velocity _____ 0.5 LHSV.

The starting temperature necessary to obtain a denitrified product containing 0.3 parts per million nitrogen was found to be 749° F. This starting temperature is a measure of the denitrification activity of the catalyst. The catalyst fouling rate was found to be 0.016° F. per hour, the rate at which it was necessary to raise the operating temperature to maintain a denitrified product nitrogen content of 0.3 part per million.

Example 4

This example describes preparation, sulfiding and testing of Catalyst 4, a comparison catalyst, consisting of nickel sulfide, tungsten sulfide, silica, alumina and titania, containing, prior to reduction and sulfiding, nickel, tungsten, silicon, aluminum and titanium in the following percentages expressed as oxides:

|  | Weight percent of total catalyst |
|---|---|
| NiO | 19.1 |
| $WO_3$ | 25.2 |
| $SiO_2$ | 19.6 |
| $Al_2O_3$ | 30.5 |
| $TiO_2$ | 5.6 |
| Total | 100.0 |

The following solutions are prepared:

SOLUTION 1

1407 grams of a stock solution of $AlCl_3$ and $H_2O$, containing 4.6 weight percent Al
200 cc. acetic acid
53 grams $TiCl_4$
529 grams of a stock solution of $NiCl_2$ and $H_2O$, containing 11.35 weight percent Ni
4500 cc. $H_2O$

SOLUTION 2

187 cc. sodium silicate, containing 78 grams $SiO_2$
2000 cc. $H_2O$

SOLUTION 3

3.75 M $NH_4OH$, quantity as indicated below

SOLUTION 4

1067 cc. sodium ammonium tungstate solution, containing 0.075 grams tungsten per cc.

SOLUTION 5

3.75 M $NH_4OH$, quantity as indicated below

Solution 2 is stirred into Solution 1, and sufficient Solution 3 is added to combined Solutions 1 and 2 to bring the pH of the mixture of Solutions 1, 2 and 3 to 5.0. Solution 4 is added to the slurry mixture of Solutions 1, 2 and 3. Sufficient Solution 5 is added to this slurry mixture to bring the pH of the mixture of Solutions 1–5 to 7.2. The resulting slurry is filtered to produce a filter cake, which is washed, partly dried, formed into extrudate particles, and washed in 1% ammonium acetate and water. The washed extrudate particles are dried and calcined at 950° F. in air for 4 hours, to produce the final catalyst in oxide form.

A 130 cc. portion of the catalyst particles so prepared was reduced and sulfided exactly as in Example 1.

The catalyst so sulfided was tested for denitrification activity, by being used to continuously hydrodenitrify another portion of the California gas oil used in Example 3, at the same conditions as used in Example 3, again at a temperature selected to maintain 0.3 parts per million nitrogen in the denitrified product. The starting temperature necessary to obtain a denitrified product containing 0.3 parts per million nitrogen was found to be 762° F. The catalyst fouling rate was found to be 0.039° F. per hour.

Example 5

This example describes preparation, sulfiding and testing of Catalyst 5, a catalyst according to the present invention, consisting of nickel sulfide, tungsten sulfide, silica, alumina, titania and zirconium phosphate, containing, prior to reduction and sulfiding, nickel, tungsten, silicon, aluminum, titanium, zirconium and phosphorus in the following percentages, expressed as oxides:

|  | Weight percent of total catalyst |
|---|---|
| NiO | 9.2 |
| $WO_3$ | 22.7 |
| $SiO_2$ | 23.9 |
| $Al_2O_3$ | 27.0 |
| $TiO_2$ | 7.2 |
| $ZrO_2 \cdot P_2O_5$ | 10.0 |
| Total | 100.0 |

The catalyst was prepared by the procedure followed in Example 4, except that: (a) the amount of each metal compound starting material was varied from the amount of the corresponding starting material used in Example 4, as necessary to result in a catalyst having the desired composition; and (b) after Solutions 1, 2 and 3 were combined, and before Solution 4 was added to the mixture of Solutions 1, 2 and 3, a mixture was added thereto consisting of 60 grams of $ZrO(H_2PO_4)_2 \cdot 3H_2O$ and 600 cc. of water.

The slurry comprising the aforesaid mixture and Solutions 1–5 was filtered, washed, hot aged, dried and calcined, exactly as in Example 3, to produce the final catalyst in oxide form.

130 cc. of the catalyst so prepared was crushed to 8–14 mesh, and was reduced and sulfided exactly as in Example 1.

The catalyst so sulfided was tested for denitrification activity, by being used to continuously hydrodenitrify a portion of a California gas oil having a boiling range of 500°–1100° F., a gravity of 15.7° API, an aniline point of 124° F., a sulfur content of 1.1%, and a nitrogen content of 5100 parts per million. The denitrification was accomplished under the following conditions, at a temperature selected to maintain 0.3 parts per million nitrogen in the denitrified product:

Pressure _____ 2300 p.s.i.g.
Hydrogen rate _____ 8000 scf./barrel of feed.
Space velocity _____ 0.5 LHSV.

The starting temperature necessary to obtain a denitrified product containing 0.3 parts per million nitrogen was found to be 755° F.

Example 6

This example describes preparation, sulfiding and testing of Catalyst 6, a comparison catalyst, consisting of nickel sulfide, tungsten sulfide, silica, alumina, titania, and phosphate, containing, prior to reduction and sulfiding, nickel, tungsten, silicon, aluminum, titanium, and phosphorus in the following percentages, expressed as oxides:

| | Weight percent of total catalyst |
|---|---|
| NiO | 10.16 |
| WO$_3$ | 25.24 |
| SiO$_2$ | 19.6 |
| Al$_2$O$_3$ | 30.0 |
| TiO$_2$ | 9.0 |
| P$_2$O$_5$ | 6.0 |
| Total | 100.0 |

The following solutions were prepared:

SOLUTION 1

1385 grams of a stock solution of AlCl$_3$ and H$_2$O, containing 4.6 weight percent Al
200 cc. acetic acid
85.6 grams TiCl$_4$
4000 cc. H$_2$O

SOLUTION 2

187 cc. sodium silicate, containing 78 grams SiO$_2$
2000 cc. H$_2$O

SOLUTION 3

3.75 M NH$_4$OH, quantity as indicated below

SOLUTION 4

39 grams NH$_4$H$_2$PO$_4$
500 cc. H$_2$O

SOLUTION 5

282 grams NiCl$_2$ and H$_2$O, containing 11.35 weight percent Ni

SOLUTION 6

1067 cc. sodium ammonium tungstate solution, containing 0.075 grams tungsten per cc.

SOLUTION 7

3.75 M NH$_4$OH, quantity as indicated below

Solution 2 was stirred into Solution 1, and sufficient Solution 3 was added to combined Solutions 1 and 2 to bring the pH of the mixture of Solutions 1, 2 and 3 to about 5.0, and create a slurry containing a precipitate. Solution 4 was added to the slurry, followed by Solution 5 and then Solution 6. Sufficient Solution 7 was added to the mixture of Solutions 1–6 to bring the pH of the mixture of Solutions 1–7 to 7.2.

The slurry comprising Solutions 1–7 was filtered, washed, hot aged, dried and calcined, exactly as in Example 3, to produce the final catalyst in oxide form.

A 130 cc. portion of the catalyst so prepared was crushed to 8–14 mesh, and was reduced and sulfided exactly as in Example 1.

The catalyst so sulfided was tested for denitrification activity, by being used to continuously hydrodenitrify another portion of the California gas oil used in Example 5, at the same conditions as used in Example 5, again at a temperature selected to maintain 0.3 parts per million nitrogen in the denitrified product. The starting temperature necessary to obtain a denitrified product containing 0.3 parts per million nitrogen was found to be 775° F.

Example 7

Another 130 cc. portion of catalyst particles prepared exactly as in Example 4 was reduced and sulfided exactly as in Example 1.

The catalyst so sulfided was tested for denitrification activity, by being used to continuously hydrodenitrify another portion of the California gas oil used in Example 5, at the same conditions as used in Example 5, again at a temperature selected to maintain 0.3 parts per million nitrogen in the denitrified product. The starting temperature necessary to obtain a denitrified product containing 0.3 parts per million nitrogen was found to be 765° F.

Example 8

This example describes preparation of Catalyst 8, a catalyst according to the present invention, consisting of nickel, tungsten, silicon, aluminum, titanium, tin, and phosphorus in the follow percentages, expressed as oxides:

| | Weight percent of total catalyst |
|---|---|
| NiO | 9.2 |
| WO$_3$ | 22.7 |
| SiO$_2$ | 23.9 |
| Al$_2$O$_3$ | 27.0 |
| TiO$_2$ | 7.2 |
| SnO$_2$·P$_2$O$_5$ | 10.0 |
| Total | 100.0 |

The catalyst was prepared exactly as in Example 5, except that, instead of adding to the mixture of Solutions 1, 2 and 3 the mixture consisting of 60 grams of $$ZrO(H_2PO_4)_2 \cdot 3H_2O$$

and 600 cc. of water, there was added to the mixture of Solutions 1, 2 and 3 a slurry mixture comprising $$SnO(H_2PO_4)_2$$

in an amount sufficient to provide 10.0 weight percent of SnO$_2$·P$_2$O$_5$ in the final catalyst in oxide form. The SnO(H$_2$PO$_4$)$_2$ was prepared by reacting SnCl$_4$ with H$_3$PO$_4$ in water with sufficient NH$_4$OH present to bring the pH to 5.0.

Example 9

This example describes preparation of Catalyst 9, a catalyst according to the present invention.

The catalyst was prepared exactly as in Example 8, except that ThCl$_4$ was used instead of SnCl$_4$, resulting in a catalyst containing thorium phosphate rather than tin phosphate.

SUMMARY OF EXAMPLES 1–2

| Ex. No. | Form of metal phosphate in catalyst | California gas oil feed boiling range and nitrogen content | Catalyst temperature (° F.) | Product nitrogen (p.p.m.) |
|---|---|---|---|---|
| 1 | Zirconium phosphate. | 550°–850° F., 2,200 p.p.m. | 710 | 1.1 |
| 2 | None | 550°–850° F., 2,200 p.p.m. | 710 | 9.4 |

SUMMARY OF EXAMPLES 3–4

| Ex. No. | Form of metal phosphate in catalyst | California gas oil feed boiling range and nitrogen content | Catalyst starting temperature to produce product having nitrogen content of 0.3 p.p.m. (° F.) | Catalyst fouling rate, per hr. (° F.) |
|---|---|---|---|---|
| 3 | Titanium phosphate. | 500°–900° F., 3,200 p.p.m. | 749 | 0.016 |
| 4 | None | 500°–900° F., 3,200 p.p.m. | 762 | 0.039 |

SUMMARY OF EXAMPLES 5–7

| Ex. No. | Form of metal phosphate in catalyst | California gas oil feed boiling range and nitrogen content | Catalyst starting temperature to produce product having nitrogen content of 0.3 p.p.m. (° F.) |
|---|---|---|---|
| 5 | Zirconium phosphate. | 500°–1,100° F., 5,100 p.p.m. | 755 |
| 6 | Mixed phosphates.[1] | 500°–1,100° F., 5,100 p.p.m. | 775 |
| 7 | None | 500°–1,100° F., 5,100 p.p.m. | 765 |

[1] It will be noted that, in contrast with the low pH used in Example 3 which resulted in selective formation of titanium phosphate, the higher pH used in this Example 6 resulted in indiscriminate reaction of the soluble phosphorus compound with a plurality of catalyst component precursors, rather than a selective reaction with the soluble titanium compound only.

From the foregoing it may be seen that the present invention provides novel and effective hydrotreating catalysts, novel methods of preparing said catalysts, and further provides methods for using said catalysts which produce improved results compared with corresponding use of prior art catalysts.

Although only specific embodiments of the present invention have been described, numerous variations could be made in those embodiments without departing from the spirit of the invention and all such variations that fall within the scope of the appended claims are intended to be embraced thereby.

What is claimed is:

1. A catalyst composite comprising
   (A) carrier comprising at least one component selected from silica and alumina and at least one hydrogenating component selected from Group VI metals and compounds thereof and Group VIII metals and compounds thereof, and
   (B) discrete, substantially insoluble metal phosphate particles
      (1) dispersed in said carrier,
      (2) consisting essentially of at least one metal phosphate selected from phosphates of zirconium, titanium, tin, thorium, cerium and hafinum,
      (3) containing substantially the entire phosphorus content of said catalyst, and
      (4) containing phosphorus in an amount of 3 to 15 weight percent of the total catalyst, expressed as $P_2O_5$.

2. A composite as in claim 1, wherein said hydrogenating component comprises nickel or a compound thereof and tungsten or a compound thereof.

3. A composite as in claim 1, wherein said hydrogenating component comprises nickel or a compound thereof and molybdenum or a compound thereof.

4. The method of manufacturing a hydrocarbon conversion catalyst which comprises substantially uniformly dispersing discrete, substantially insoluble metal phosphate particles in a carrier comprising at least one component selected from silica and alumina and at least one hydrogenating component selected from Group VI metals and compounds thereof and Group VIII metals and compounds thereof, said metal phosphate particles
   (1) consisting essentially of at least one metal phosphate selected from phosphates of zirconium, titanium, tin, thorium, cerium and hafinum,
   (2) containing substantially the entire phosphorus content of said catalyst,
   (3) containing phosphorus in an amount of 3 to 15 weight percent of the total catalyst, expressed as $P_2O_5$.

5. The method as in claim 4, wherein said metal phosphate particles are preformed, are dispersed in a liquid medium comprising precursors of said carrier, and said liquid medium is caused to form a gel surrounding said particles.

6. The method as in claim 4, wherein said particles are formed by reaction of a water-soluble phosphorus compound with a water-soluble compound selected from compounds of zirconium, titanium, tin, thorium, cerium and hafnium, said reaction being accomplished at a pH below 3.0 in an aqueous medium comprising precursors of said carrier, and wherein following formation of said particles said liquid medium is caused to form a gel surrounding said particles.

7. The method as in claim 4, wherein said hydrogenating component comprises nickel or a compound thereof and tungsten or a compound thereof.

8. The method as in claim 4, wherein said hydrogenating component comprises nickel or a compound thereof and molybdenum or a compound thereof.

References Cited

UNITED STATES PATENTS

| | | | |
|---|---|---|---|
| 2,890,167 | 6/1959 | Haensel | 252—435 |
| 3,125,510 | 3/1964 | Tupman et al. | |
| 3,130,147 | 4/1964 | Dwyer et al. | 252—435 |
| 3,132,089 | 5/1964 | Hass et al. | |
| 3,213,036 | 10/1965 | Morrell | 252—435 |
| 3,205,165 | 9/1965 | Hilfman | 208—216 |

DELBERT E. GANTZ, Primary Examiner

G. J. CRASSANAKIS, Assistant Examiner

U.S. Cl. X.R.

208—254; 252—455, 458, 459, 465, 466